United States Patent [19]

Hudgin

[11] 3,948,832

[45] Apr. 6, 1976

[54] STABILIZED ETHYLENE-CARBON MONOXIDE COPOLYMERS CONTAINING AN EPOXY COMPOUND

[75] Inventor: Donald E. Hudgin, Princeton Junction, N.J.

[73] Assignee: Atlantic Richfield Company, Los Angeles, Calif.

[22] Filed: Sept. 25, 1974

[21] Appl. No.: 508,973

[52] U.S. Cl...... 260/23 EP; 260/18 PF; 260/45.8 A; 260/63 CQ; 260/836; 260/837 R
[51] Int. Cl.².............................................. C08G 2/26
[58] Field of Search........ 260/63 CQ, 18 PF, 23 EP, 260/45.8 A, 836, 837 R

[56] References Cited
UNITED STATES PATENTS

| 3,083,184 | 3/1963 | Loeb | 260/63 CQ |
| 3,139,414 | 6/1964 | Ranalli | 260/837 R |
| 3,244,651 | 4/1966 | Pannell | 260/836 |
| 3,251,792 | 5/1966 | Homberg | 260/45.8 A |
| 3,629,363 | 12/1971 | Breda | 260/836 |
| 3,661,822 | 5/1972 | Lee | 260/45.8 A |
| 3,780,140 | 12/1973 | Hammer | 260/63 CQ |

*Primary Examiner*—Eugene C. Rzucidlo
*Attorney, Agent, or Firm*—Coleman R. Reap

[57] ABSTRACT

Ethylene-carbon monoxide copolymer compositions are stabilized against thermal degradation by the incorporation therein of organic epoxy-containing compounds.

7 Claims, No Drawings

STABILIZED ETHYLENE-CARBON MONOXIDE COPOLYMERS CONTAINING AN EPOXY COMPOUND

BACKGROUND OF THE INVENTION

This invention relates to ethylene-carbon monoxide copolymers and more particularly to heat stable ethylene-carbon monoxide copolymer compositions.

Ethylene-carbon monoxide copolymers are of considerable interest because of their potential as engineering plastics. These materials have physical properties which are superior to many other materials commonly used in industry and, in addition, offer the advantage of low cost since carbon monoxide is readily available as a by-product in the manufacture of steel and can also be inexpensively prepared from other chemical processes.

In spite of the advantages offered by ethylene-carbon monoxide copolymers, they have not attained commercial acceptance partly due to the fact that they have poor resistance to thermal degradation during post polymerization processing operations. Since polymeric end products such as films, sheets and shaped articles are most commonly made by heating and melting polymeric compositions and extruding or injection molding the melt, it is very important that these compositions be able to withstand the temperatures encountered in such post forming operations.

SUMMARY OF THE INVENTION

Ethylene-carbon monoxide copolymer compositions have now been discovered which have greater resistance to thermal degradation. Accordingly, it is an object of the invention to present improved ethylene-carbon monoxide copolymer compositions. It is another object of the invention to present ethylene-carbon monoxide which have improved heat stability. It is another object of the invention to present ethylene-carbon monoxide copolymers which will not undergo serious color degradation during post polymerization processing operations at elevated temperatures. These and other objects of the invention will become more apparent from the description and examples which follow.

In accordance with the present invention, the thermal stability of ethylene-carbon monoxide copolymers is significantly improved by incorporating therein a small amount of an organic compound which contains one or more epoxy groups and which is free of substituents which adversely affect the performance of the epoxide as a stabilizer or adversely affect the properties of the polymeric product.

DESCRIPTION OF THE INVENTION

The molecular weight and chemical constitution of the ethylene-carbon monoxide copolymers treated in accordance with the invention are not critical and in general any ethylene-carbon monoxide copolymer can be stabilized by the disclosed stabilizers. The following details are intended to be descriptive and not limitative. The ethylene-carbon monoxide copolymer compositions most improved by the stabilizers of the invention are those having molecular weights in the range of about 500 to 50,000 or more and containing up to 50 weight percent carbon monoxide. The most useful ethylene-carbon monoxide copolymers contain about 1 to 50 weight percent carbon monoxide. As can be readily appreciated, the copolymer compositions may contain additional polymeric components which may be either physically admixed with the ethylenecarbon monoxide copolymer or chemically combined with the ethylene and carbon monoxide as components of the copolymer. Monomers which may be copolymerized with the ethylene and carbon monoxide include ethylenically unsaturated aliphatic or aromatic compounds including olefins, such as propylene, isobutylene, etc.; dienes, such as butadiene, isoprene, etc.; acrylic monomers, such as acrylic acid, methyl methacrylate, acrylonitrile, etc.; aromatic compounds, such as styrene, vinyl toluene, etc. The additional polymeric component is usually present in amounts up to about 50 percent by weight.

The preparation of ethylene-carbon monoxide copolymers is well known and is described in detail in U.S. Pat. Nos. 2,495,286; 2,641,590; 3,083,184; 3,530,109; 3,694,412; and 3,689,460.

Compounds which can be used to stabilize the ethylene-carbon monoxide compounds in accordance with the invention are organic compounds which contain one or more epoxy groups and which are free of substituents which adversely affect the properties of the copolymer composition or the operation of the epoxide as a stabilizer. The organic compound may be aliphatic, including cycloaliphatic, or aromatic and is preferably free from ethylenic unsaturation or other groups which are subject to oxidative degradation. Thus, epoxy group-containing hydrocarbons and other organic compounds containing heterogeneous atoms such as epoxy-containing ethers, esters, phosphonates, etc., and high molecular weight polymeric compounds containing epoxy groups are included among the preferred compounds usable in the invention. Preferred epoxides are those containing at least 8 carbon atoms. Exemplary of compounds are 1,2-epoxy pentane; 1,2-epoxy octane; styrene epoxide; butyl epoxy stearate; 3,4-epoxy-6-methylcyclohexylmethyl-3,4-epoxy-6-methylcyclohexane carboxylate; epoxidized polybutadiene; poly(allyl glycidyl ether); p-chlorophenoxypropylene oxide; dicyclopentadiene diepoxide; diglycidyl ether of bisphenol A; epoxidized fatty acid triglycerides such as epoxidized soybean oil, etc. The preferred epoxy compounds are epoxidized fatty acid triglycerides such as epoxidized soybean oil and diglycidyl ether of bisphenol A.

The epoxides are effective in amounts of about 0.1 to about 20 percent, based on the total weight of ethylenecarbon monoxide copolymer in the composition. The preferred concentration of epoxide in the composition is about 1 to 10 percent based on the total weight of ethylene-carbon monoxide present in the composition.

The organic epoxy-containing compounds may be used in combination with other stabilizers or antioxidants if desired. The amount of other stabilizer or antioxidant used in the composition may vary over the same range as the epoxide, i.e., about 0.1 to 20 percent and preferably about 1 to 10 percent based on the weight of ethylene-carbon monoxide in the polymeric composition.

The stabilizer or mixture of stabilizers can be incorporated into the compositions by any of the known methods. For instance, they may be incorporated into the polymerization mixture prior to or during the polymerization. This method has the advantage of stabilizing the polymer from the time it is formed. The stabilizers can also be incorporated into the polymer after the polymerization is completed. This is most conveniently accomplished by blending the stabilizer into the copolymer which is usually in the form of a melt or fine particles. The stabilizer may be incorporated into the copolymer composition in the form of a powder or dissolved in a solvent. The method of incorporating the stabilizers into the copolymer composition is not considered to be critical.

Other additives such as fillers, extenders, plasticizers, coloring agents, other polymeric materials, etc. can be added to the copolymer compositions being stabilized. These are usually most conveniently added to the polymer after the polymerization.

The following examples illustrate specific examples of the invention. Unless otherwise indicated, parts and percentages are on a weight basis.

EXAMPLE I

A sample ethylene-carbon monoxide copolymer containing 47.11 percent by weight carbon monoxide is placed on a Fisher-Johns melting point block set at 250°C. and the melting is observed. After five minutes the melted polymer is examined and observed to have a dark orange color and exhibit gelling and surface skin formation.

EXAMPLE II

A sample of the same ethylene-carbon monoxide copolymer used in Example I is ground with 1.3 percent based on the weight of copolymer of epoxidized soybean oil having an oxirane oxygen content of 7.2 weight percent (sold by Swift Chemical Company under the trademark Epoxol 7-4) and placed on a Fisher-Johns melting point block set at 250°C. and the melting observed. After five minutes the melted polymer is examined and observed to have a light yellow color and no gelling or surface skin formation.

EXAMPLE III

The procedure of Example II is repeated except that 2.5% Epon 828 is substituted for the epoxidized soybean oil. (Epon 828 is a registered trademark of Shell Oil Company for diglycidyl ether of bisphenol A, equivalent weight 188). After five minutes on the Fisher-Johns melting point block the sample has a light yellow color and exhibits no gel or skin formation.

Examples II and III illustrate the improved color stability, gel, and skin formation resistance obtained when epoxy compounds are blended into an ethylene-carbon monoxide copolymer as stabilizers. Example I is a stabilizer-free control.

EXAMPLE IV

The procedure of Example II is repeated except that 1,2-epoxy octane is substituted for the epoxidized soybean oil. The resulting composition will exhibit improved thermal stability and improved gel and skin formation resistance.

EXAMPLE V

The procedure of Example II is repeated except that styrene epoxide is substituted for the epoxidized soybean oil. The resulting composition will exhibit improved thermal stability and improved gel and skin formation resistance.

EXAMPLE VI

The procedure of Example II is repeated except that epoxidized linseed oil is substituted for the epoxidized soybean oil. The resulting composition will exhibit improved thermal stability and improved resistance to skin and gel formation.

Although the invention is described with particular reference to specific embodiments, the scope of the invention is not limited thereto but is defined by the breadth of the appended claims.

I claim:

1. A stabilized ethylene carbon monoxide copolymer composition containing about 0.1 to 20% based on the weight of polymer in the composition of an organic compound free of substituents which interfere with the stabilizing effect of the compound and containing at least one epoxy group.

2. The composition of claim 1 wherein said organic compound contains at least 8 carbon atoms.

3. The composition of claim 1 wherein said organic compound is present in an amount of about 1 to 10 percent based on the weight of polymer in the composition.

4. The composition of claim 1 wherein said organic compound is an epoxidized fatty acid triglyceride.

5. The composition of claim 4 wherein said epoxidized fatty acid triglyceride is epoxidized soybean oil.

6. The composition of claim 1 wherein said compound is diglycidylether of bisphenol A.

7. The composition of claim 1 containing about 0.1 to 20 percent based on the total weight of polymer in the composition of a second stabilizer.

* * * * *